United States Patent
Lee et al.

(10) Patent No.: US 10,536,634 B2
(45) Date of Patent: Jan. 14, 2020

(54) MULTIPLE LENS SYSTEM AND PORTABLE ELECTRONIC DEVICE EMPLOYING THE SAME

(71) Applicant: Chiun Mai Communication Systems, Inc., New Taipei (TW)

(72) Inventors: Shang-Wen Lee, New Taipei (TW); Wen-Yi Kuo, New Taipei (TW); Meng-Jer Huang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 104 days.

(21) Appl. No.: 15/458,161

(22) Filed: Mar. 14, 2017

(65) Prior Publication Data

US 2017/0272650 A1   Sep. 21, 2017

(30) Foreign Application Priority Data

Mar. 21, 2016   (CN) .......................... 2016 1 0159721

(51) Int. Cl.
| | |
|---|---|
| H04N 7/16 | (2011.01) |
| H04N 5/232 | (2006.01) |
| G02B 13/06 | (2006.01) |
| H04M 1/02 | (2006.01) |

(52) U.S. Cl.
CPC ......... H04N 5/23238 (2013.01); G02B 13/06 (2013.01); H04M 1/0264 (2013.01); H04N 5/23229 (2013.01); H04N 5/23245 (2013.01)

(58) Field of Classification Search
CPC ......... H04N 2013/0088; H04N 5/3415; H04N 3/08; H04N 13/261
See application file for complete search history.

(56) References Cited

U.S. PATENT DOCUMENTS

| | | | | | |
|---|---|---|---|---|---|
| 3,625,608 | A | * | 12/1971 | Bouzard ................ | G03B 27/36 355/57 |
| 3,626,094 | A | * | 12/1971 | Widdekind ............ | H04N 5/222 348/96 |
| 3,733,979 | A | * | 5/1973 | England ................. | B41B 17/04 359/211.1 |
| 3,891,303 | A | * | 6/1975 | Barquero ............... | G03B 35/00 352/65 |

(Continued)

FOREIGN PATENT DOCUMENTS

| | | |
|---|---|---|
| CN | 1837880 A | 9/2006 |
| CN | 101833157 A | 9/2010 |

(Continued)

*Primary Examiner* — Pankaj Kumar
*Assistant Examiner* — Timothy R Newlin
(74) *Attorney, Agent, or Firm* — ScienBiziP, P.C.

(57) ABSTRACT

A multiple lens system includes at least one lens unit, at least one reflecting unit, a first image sensing element, a second image sensing element, and a processing unit. The processing unit is electrically connected to the first image sensing element and the second image sensing element. The processing unit controls at least one angle of the at least one reflection unit according to a capturing mode, changes at least one optical path of the at least one reflection unit, and selects at least one lens of the at least one lens unit. At least one image beam obtained by the selected at least one lens is reflected or projected to at least one of the first image sensing element and the second image sensing element through the at least one optical path.

10 Claims, 15 Drawing Sheets

(56) References Cited

U.S. PATENT DOCUMENTS

| | | | | |
|---|---|---|---|---|
| 4,303,316 A * | 12/1981 | McElveen | G02B 27/2264 | 352/57 |
| 4,552,442 A * | 11/1985 | Street | G03B 35/00 | 396/327 |
| 4,574,197 A * | 3/1986 | Kliever | G02B 23/12 | 250/334 |
| 5,204,922 A * | 4/1993 | Weir | A61B 5/14539 | 356/419 |
| 5,734,477 A * | 3/1998 | Tsai | H04N 1/0402 | 358/296 |
| 6,473,238 B1 * | 10/2002 | Daniell | H04N 13/307 | 359/622 |
| 6,529,640 B1 * | 3/2003 | Utagawa | H04N 5/235 | 382/284 |
| 9,554,041 B1 * | 1/2017 | Shin | H04N 5/23238 | |
| 2003/0072570 A1 * | 4/2003 | Seo | G03B 35/00 | 396/331 |
| 2004/0266477 A1 * | 12/2004 | Murata | H04M 1/0212 | 455/556.1 |
| 2005/0200718 A1 * | 9/2005 | Lee | H04N 1/212 | 348/220.1 |
| 2008/0088719 A1 * | 4/2008 | Jacob | H04N 5/2256 | 348/241 |
| 2008/0219654 A1 * | 9/2008 | Border | H04N 5/23212 | 396/89 |
| 2009/0116112 A1 * | 5/2009 | Lin | G02B 5/0833 | 359/584 |
| 2010/0067086 A1 * | 3/2010 | Khan | G02B 5/12 | 359/239 |
| 2012/0154549 A1 * | 6/2012 | An | G03B 17/565 | 348/49 |
| 2013/0278785 A1 * | 10/2013 | Nomura | H04N 5/23287 | 348/208.11 |
| 2014/0063505 A1 * | 3/2014 | Bajraszewski | A61B 3/102 | 356/450 |
| 2014/0092460 A1 * | 4/2014 | Schwedt | G02B 21/0092 | 359/238 |
| 2014/0218587 A1 * | 8/2014 | Shah | G03B 5/00 | 348/340 |
| 2015/0085083 A1 * | 3/2015 | Chen | H04N 13/296 | 348/49 |
| 2017/0219814 A1 * | 8/2017 | Letter | G02B 23/2476 | |
| 2017/0285238 A1 * | 10/2017 | Hirshberg | G02B 5/3083 | |

FOREIGN PATENT DOCUMENTS

| | | |
|---|---|---|
| CN | 101852979 A | 10/2010 |
| CN | 101521745 B | 4/2011 |

* cited by examiner

MULTIPLE LENS SYSTEM AND PORTABLE ELECTRONIC DEVICE EMPLOYING THE SAME

CROSS-REFERENCE TO RELATED DISCLOSURES

This disclosure claims priority to Chinese Patent Application No. 201610159721.6 filed on Mar. 21, 2016, the contents of which are incorporated by reference herein.

FIELD

The subject matter herein generally relates to a multiple lens system and a portable electronic device using the multiple lens system.

BACKGROUND

Portable electronic devices normally need to set a specific lens on a front lens and a rear lens for capturing ultra wide angle images or fish-eye panoramic images. Two groups of fish-eye lenses can also be used for capturing ultra wide angle images or 360 degree panoramic images. However, a capturing angle of the two groups of fish-eye lenses is too wide to get a preferred image smoothness when capturing a specific subject in a small area. Furthermore, the fish-eye lens has higher imaging deformation rate relative to a normal lens.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
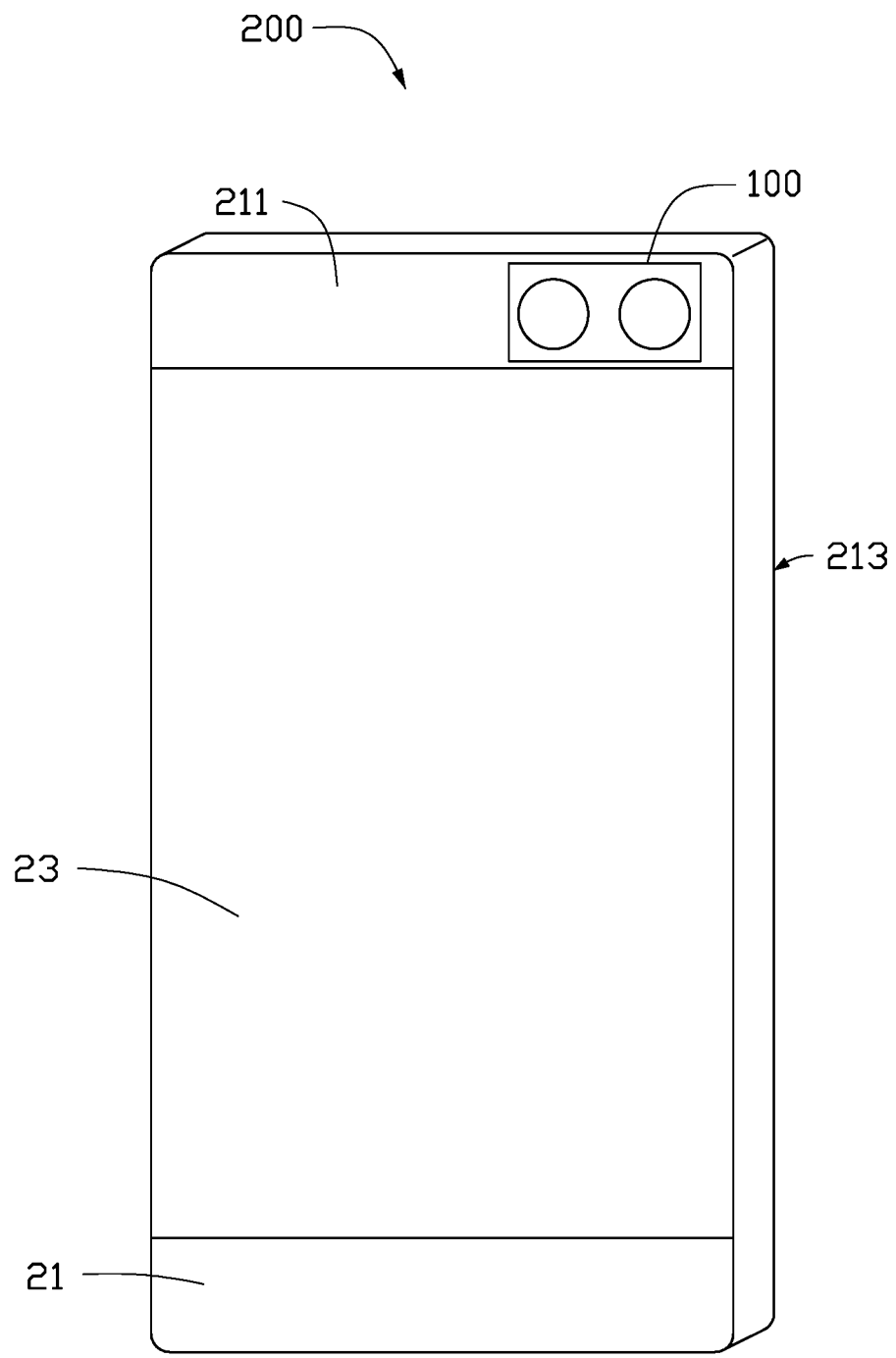
FIG. 1 is a schematic diagram of a multiple lens system in a portable electronic device according to an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates a multiple lens system 100 in a portable electronic device 200. In this exemplary embodiment, the portable electronic device 200 can be a mobile phone, a tablet computer, or a personal digital assistant (PDA). The portable electronic device 200 includes a main body 21 and a display unit 23. The main body 21 includes a first surface 211 and a second surface 213 facing away from each other.

The display unit 23 is positioned on the first surface 211. The display unit 23 can be a touch screen for displaying images and user interface.

Figure 2:
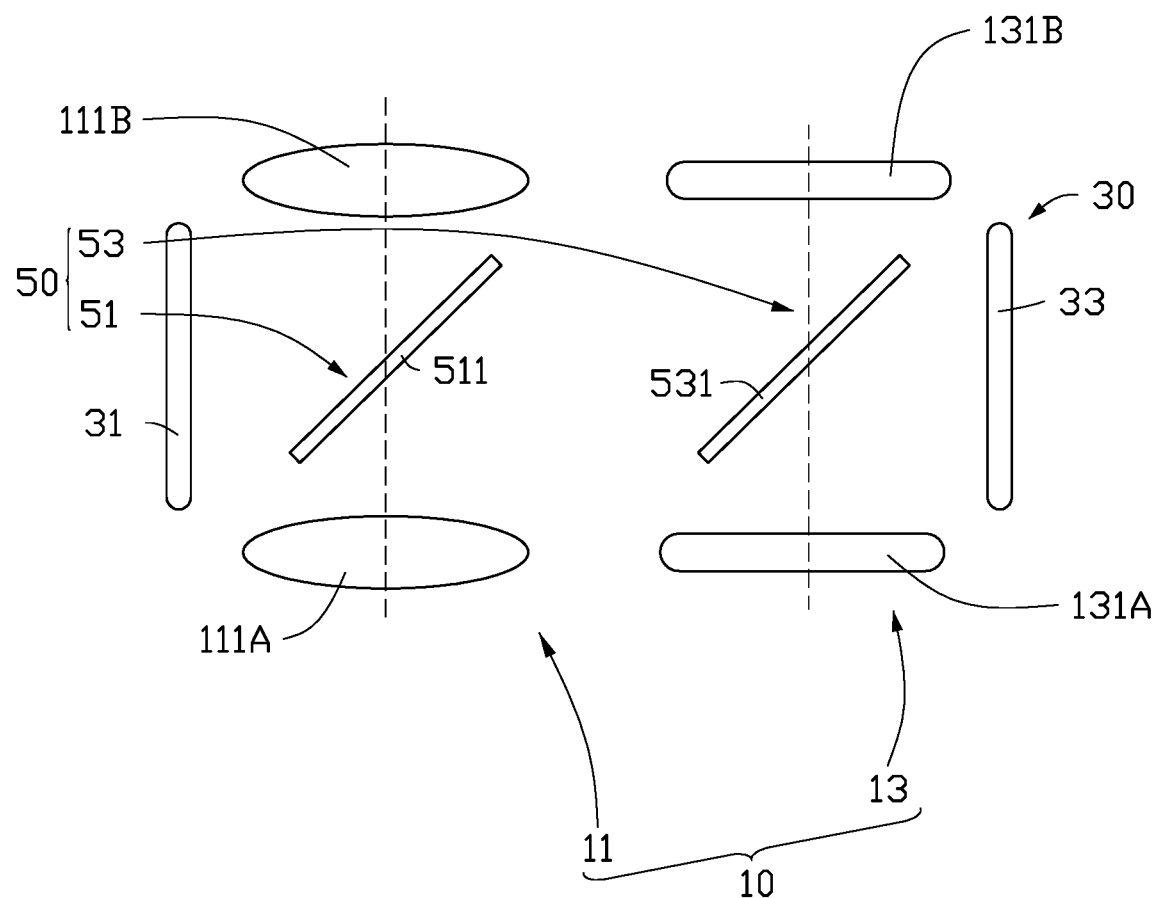
FIG. 2 is a schematic diagram of a portion of the multiple lens system of FIG. 1 according to an exemplary embodiment of the present disclosure.
Figure 3:
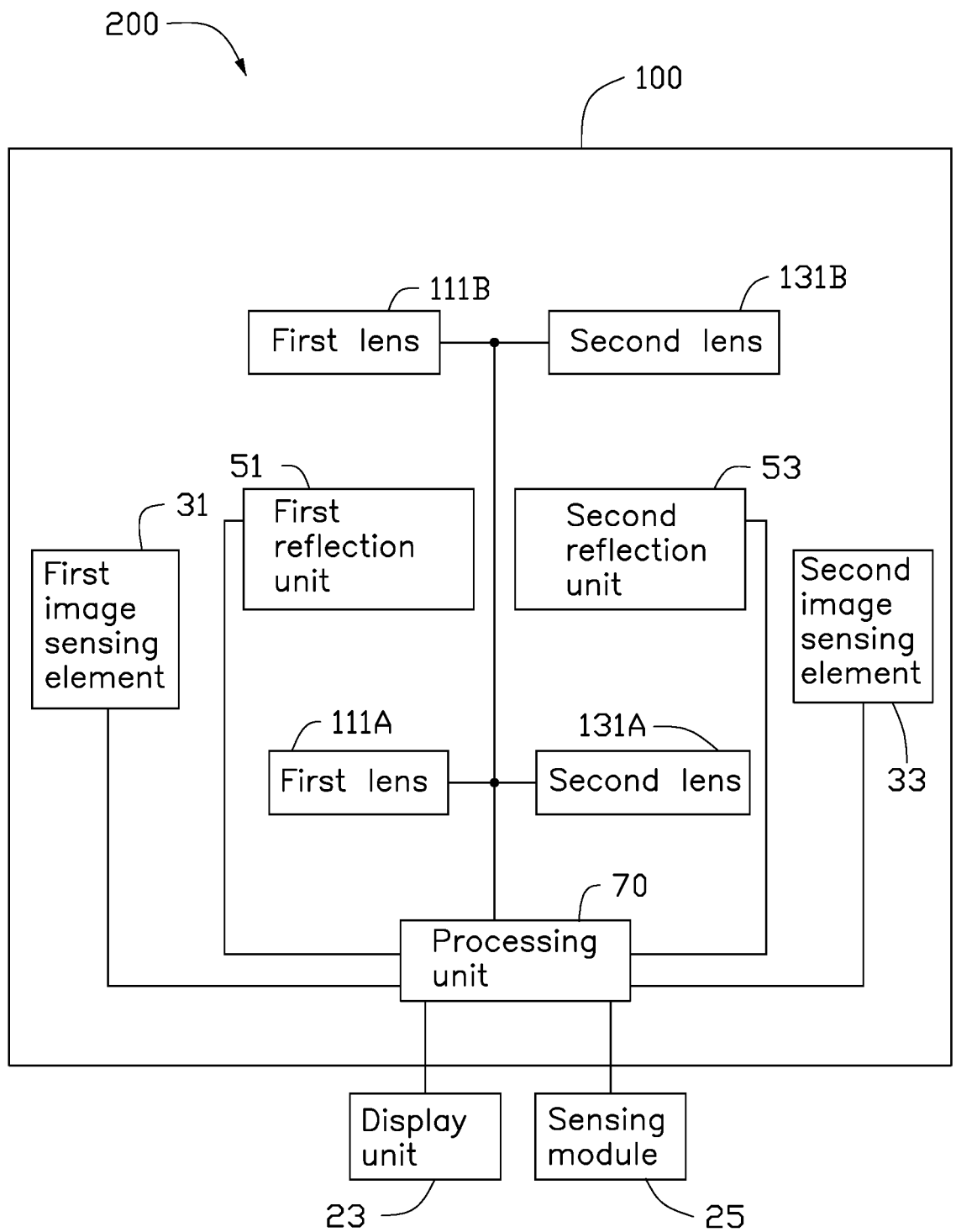
FIG. 3 is a block diagram of the portable electronic device of FIG. 1 according to an exemplary embodiment of the present disclosure.

As illustrated in FIG. 2 and FIG. 3, the multiple lens system 100 can be a portion of the portable electronic device 200. The multiple lens system 100 is positioned at an end of the portable electronic device 200. The multiple lens system 100 includes a lens module 10, an image sensing module 30, a reflection module 50, and a processing unit 70.

In the present exemplary embodiment, the lens module 10 includes two lens units (e.g., a first lens unit 11 and a second lens unit 13). The first lens unit 11 includes two first lenses 111A, 111B. The first lenses 111A, 111B can be substantially the same type. For example, the first lenses 111A, 111B can be both fish-eye lenses or other wide angle lenses. The first lens 111A is positioned on the first surface 211 of the portable electronic device 200 and the first lens 111B is positioned on the second surface 213 of the portable electronic device 200. An optical axis of the first lens 111A is overlapped with an optical axis of the first lens 111B (shown in dotted line in FIG. 2). For example, the first lenses 111A, 111B are respectively symmetrically positioned at two ends of an optical axis.

The second lens unit 13 includes two second lenses 131A, 131B. The second lens 131A is the same as the second lens 131B. The second lens 131A and 131B can be normal lenses or function lenses. The second lens 131A is positioned on the first surface 211 of the portable electronic device 200. The second lens 131B is positioned on the second surface 213 of the portable electronic device 200. An optical axis of the second lens 131A is overlapped with an optical axis of the second lens 131B (shown in dotted line in FIG. 2). For example, the second lenses 131A, 131B are respectively symmetrically positioned at two ends of an optical axis.

The angle of coverage of the first lenses 111A, 111B is different from the angle of coverage of the second lenses 131A, 131B. In other exemplary embodiments, the first lenses 111A, 111B of the first lens unit 11 and the second lenses 131A, 131B of the second lens unit 13 are not limited to the fish-eye lenses or other wide angle lenses, but can include other field of view (FOV) lenses.

In the present exemplary embodiment, at least one of the lenses can achieve different capturing functions. For example, when the first lenses 111A, 111B of the first lens unit 11 are selected, a first capturing mode can be selected for capturing ultra wide angle images or fish-eye panoramic images. For example, the first capturing mode is a panoramic capturing mode. When the second lenses 131A, 131B of the second lens unit 13 are selected, a second capturing mode can be selected for capturing normal images. For example, the second capturing mode is a normal capturing mode. When the first lens 111A and the second lens 131A positioned on the first surface 211 of the main body 21 are selected, a third capturing mode can be selected to achieve a front fusion capturing mode. When the first lens 111B and the second lens 131B positioned on the second surface 213 of the main body 21 are selected, a fourth capturing mode can be selected to achieve a rear fusion capturing mode. In the third capturing mode and the fourth capturing mode, since a fish-eye lens and a normal lens are selected, the third capturing mode and the fourth capturing mode can capture fish-eye panoramic images with a preferred imaging deformation rate relative to a single normal lens.

The image sensing module 30 can be a charge coupled device (CCD), a complementary metal oxide semiconductor (CMOS), or other image sensing elements. In the present exemplary embodiment, the image sensing module 30 includes two image sensing elements (e.g., a first image sensing element 31 and a second image sensing element 33). The first image sensing element 31 and the second image sensing element 33 are positioned on two sides of the lens module 10, and are both electrically connected to the processing unit 70. The first image sensing element 31 and the second image sensing element 33 are configured to capture images cooperatively with the lens module 10. For example, the lens module 10 captures images with the image sensing module 30. The processing unit 70 is also electrically connected to the first lenses 111A, 111B and the second lenses 131A, 131B.

The reflection module 50 can be a total reflection prism or other reflection mirrors. The reflection module 50 includes two reflection units (e.g., a first reflection unit 51 and a second reflection unit 53). In the present exemplary embodiment, the first reflection unit 51 and the second reflection unit 53 each include a reflection element. For example, the first reflection unit 51 includes a first reflection element 511. The second reflection unit 53 includes a second reflection element 531. The first reflection element 511 is positioned between the first lens 111A and the first lens 111B of the first lens unit 11. The second reflection element 531 is positioned between the second lens 131A and the second lens 131B of the second lens unit 13. The reflection module 50 is configured to reflect or project image beams captured by the lenses of the lens module 10 to the first image sensing element 31 and the second image sensing element 33.

The processing unit 70 can be an image processer. The processing unit 70 is electrically connected to the image sensing module 30, the reflection module 50, the first lens unit 11, and the second lens unit 13. The processing unit 70 controls the reflection module 50 by moving (e.g., rotating) the reflection module 50 according to the capturing modes, thereby adjusting at least one angle of the first reflection element 511 and the second reflection element 531, and changing at least one optical path of the image beams captured by each lens. Then, different lens configurations can be selected to achieve different capturing functions and obtain single or multiple image information.

Figure 4:
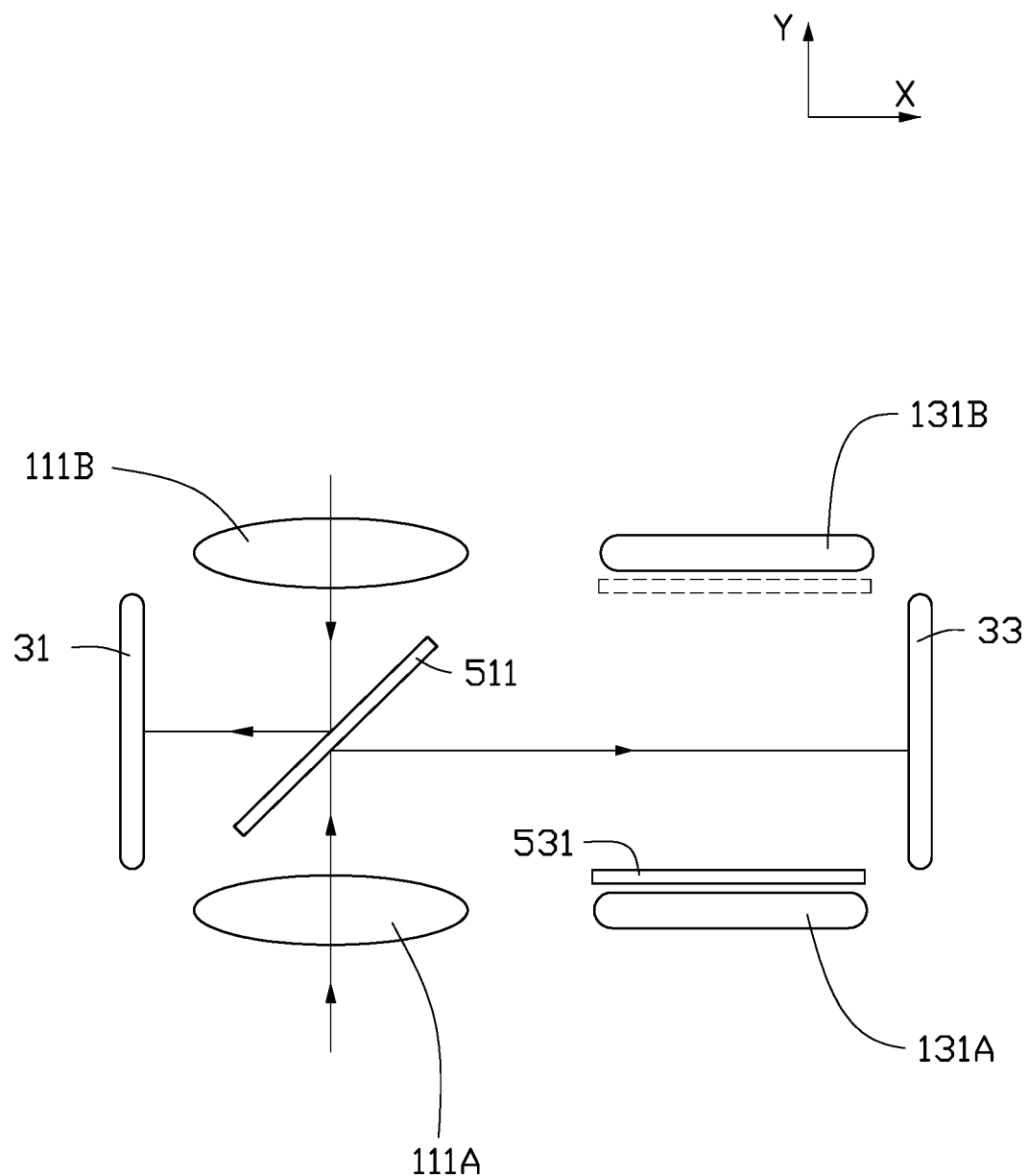
FIG. 4 is a diagram showing an optical path of the multiple lens system of FIG. 1 in a first capturing mode according to an exemplary embodiment of the present disclosure.

As illustrated in FIG. 4, when the first capturing mode (e.g., the panoramic capturing mode) is selected, the processing unit 70 controls the first reflection element 511 by moving (e.g., rotating) the first reflection element 511 to a first angle. For example, an angle between the first reflection element 511 and a horizontal axis (X axis) is about 45 degrees. The processing unit 70 also controls the second reflection element 531 by moving (e.g., rotating) the second reflection element 531 to a second angle. For example, the second reflection element 531 is positioned parallel to the horizontal axis (X axis). The second reflection element 531 covers one of the second lenses (e.g., the second lens 131A). The other second lens (e.g., the second lens 131B), which is not covered by the second reflection element 531, can be covered by another shielding element (shown in dotted line in FIG. 4), thereby covering the light beam without imaging to avoid affecting image quality. A first image beam obtained by the first lens 111A of the first lens unit 11 can be reflected or projected onto a first reflection surface of the first reflection element 511 to the second image sensing element 33. A second image beam obtained by the first lens 111B of the first lens unit 11 can be reflected or projected onto a second reflection surface, opposite of the first reflection surface, of the first reflection element 511 to the first image sensing element 31. Since the image beams obtained by the second lenses 131A, 131B of the second lens unit 13 do not have an optical path, the image beams obtained by the second lenses 131A, 131B are not reflected or projected to the first image sensing element 31 or the second image sensing element 33.

Figure 5:
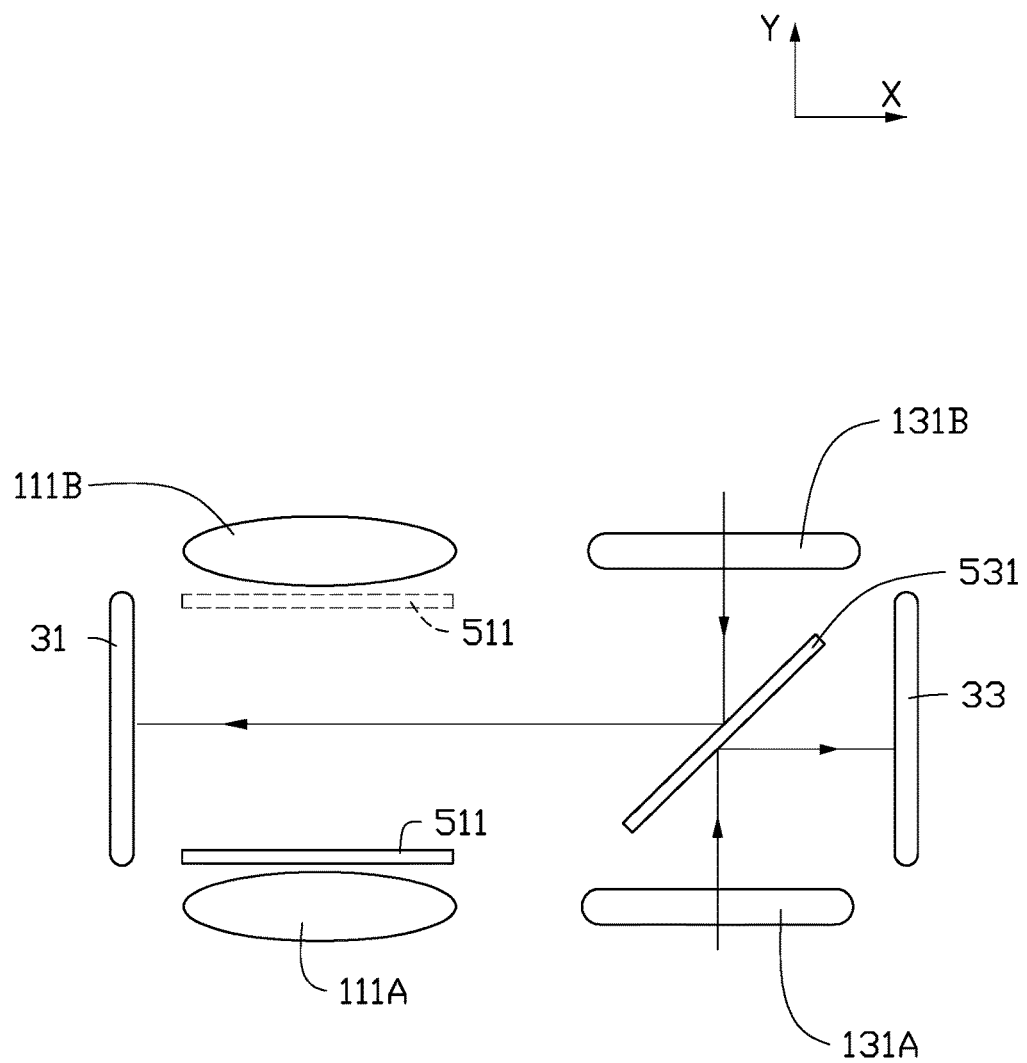
FIG. 5 is a diagram showing an optical path of the multiple lens system of FIG. 1 in a second capturing mode according to an exemplary embodiment of the present disclosure.

As illustrated in FIG. 5, when the second capturing mode is selected, the processing unit 70 controls the first reflection element 511 by moving (e.g., rotating) the first reflection element 511 to the second angle. For example, the first reflection element 511 is positioned parallel to the horizontal axis (X axis). The first reflection element 511 covers one of the first lenses (e.g., the first lens 111A). The other first lens (e.g., the first lens 111B), which is not covered by the first reflection element 511, can be covered by another shielding element (shown in dotted line in FIG. 5), thereby covering the light beam without imaging to avoid affecting image quality. The processing unit 70 also controls the second reflection element 531 by moving (e.g., rotating) the second reflection element 531 to the first angle. For example, an angle between the second reflection element 531 and the horizontal axis (X axis) is about 45 degrees. A first image beam obtained by the second lens 131A of the second lens unit 13 can be reflected or projected onto a first reflection surface of the second reflection element 531 to the second image sensing element 33. A second image beam obtained by the second lens 131B of the second lens unit 13 can be reflected or projected onto a second reflection surface, opposite of the first reflection surface, of the second reflection element 531 to the first image sensing element 31. Since the image beams obtained by the first lenses 111A, 111B of the first lens unit 11 do not have an optical path, the image beams obtained by the first lenses 111A, 111B are not reflected or projected to the first image sensing element 31 or the second image sensing element 33.

Figure 6:
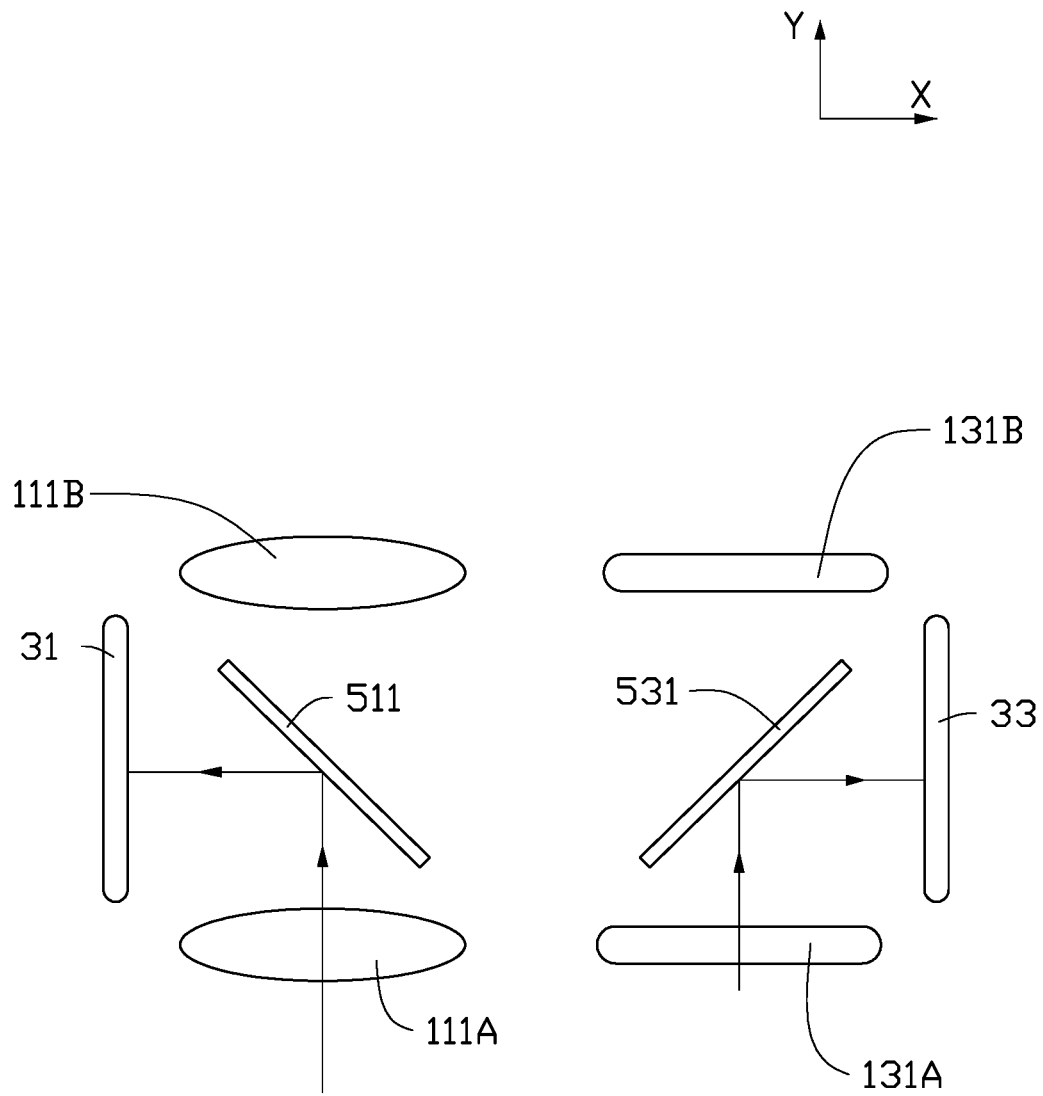
FIG. 6 is a diagram showing an optical path of the multiple lens system of FIG. 1 in a third capturing mode according to an exemplary embodiment of the present disclosure.

As illustrated in FIG. 6, when the third capturing mode is selected, the processing unit 70 controls the first reflection element 511 by moving (e.g., rotating) the first reflection element 511 to a third angle. For example, an angle between the first reflection element 511 and the horizontal axis (X axis) is about 135 degrees. The processing unit 70 also controls the second reflection element 531 by moving (e.g., rotating) the second reflection element 531 to the first angle. For example, an angle between the second reflection element 531 and the horizontal axis (X axis) is about 45 degrees. A first image beam obtained by the first lens 111A of the first lens unit 11 can be reflected or projected onto the first reflection surface of the first reflection element 511 to the first image sensing element 31. A second image beam obtained by the second lens 131A of the second lens unit 13 can be reflected or projected onto the first reflection surface of the second reflection element 531 to the second image sensing element 33. Since the image beams obtained by the first lens 111B and the second lens 131B positioned on the second surface 213 of the portable electronic device 200 do not have an optical path, the image beams obtained by the first lens 111B and the second lens 131B are not reflected or projected to the first image sensing element 31 or the second image sensing element 33.

Figure 7:
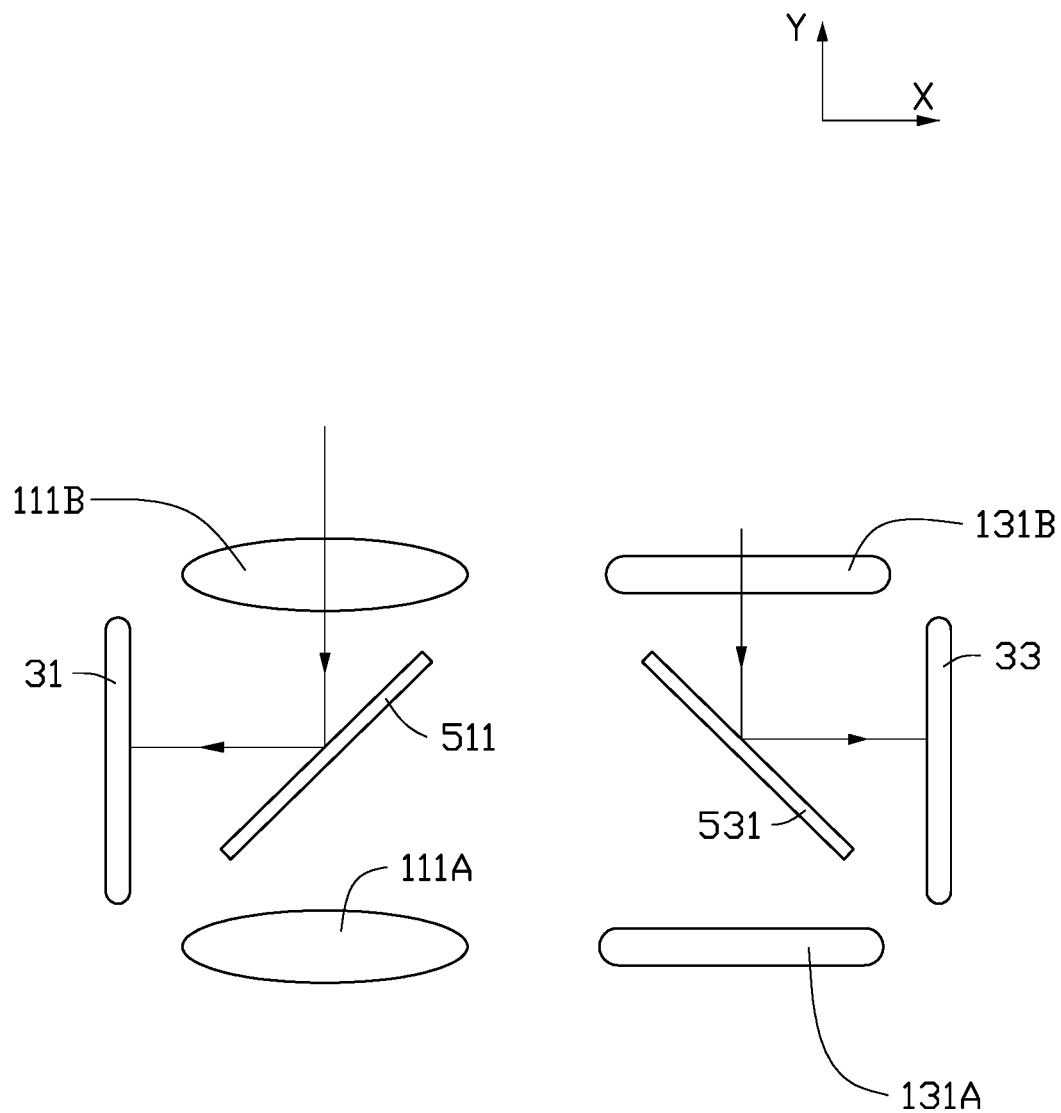
FIG. 7 is a diagram showing an optical path of the multiple lens system of FIG. 1 in a fourth capturing mode according to an exemplary embodiment of the present disclosure.

As illustrated in FIG. 7, when the fourth capturing mode is selected, the processing unit 70 controls the first reflection element 511 by moving (e.g., rotating) the first reflection element 511 to the first angle. For example, an angle between the first reflection element 511 and the horizontal axis (X axis) is about 45 degrees. The processing unit 70 also controls the second reflection element 531 by moving (e.g., rotating) the second reflection element 531 to the third angle. For example, an angle between the second reflection element 531 and the horizontal axis (X axis) is about 135 degrees. A first image beam obtained by the first lens 111B of the first lens unit 11 can be reflected or projected onto the second reflection surface of the first reflection element 511 to the first image sensing element 31. A second image beam obtained by the second lens 131B of the second lens unit 13 can be reflected or projected onto the second reflection surface of the second reflection element 531 to the second image sensing element 33. Since the image beams obtained by the first lens 111A and the second lens 131A positioned on the first surface 211 of the portable electronic device 200 do not have an optical path, the image beams obtained by the first lens 111A and the second lens 131A are not reflected or projected to the first image sensing element 31 or the second image sensing element 33.

In other exemplary embodiments, only a single lens from the first lens unit 11 or the second lens unit 13 can be selected according to use's need to achieve other capturing modes.

In other exemplary embodiments, the first reflection unit 51 and the second reflection unit 53 are not limited to having a single reflection element, they can include two or more reflection elements. For example, the first reflection unit 51 and the second reflection unit 53 can each include two reflection elements. In another example, one of the first reflection unit 51 and the second reflection unit 53 includes one reflection element, and the other of the first reflection unit 51 and the second reflection unit 53 includes two reflection elements. When the reflection element is used to reflect or project the image beam to one corresponding image sensing element, the processing unit 70 controls the reflection element by moving (e.g., rotating) the reflection element to the first angle or the third angle. For example, an angle between the reflection element and the horizontal axis (X axis) is about 45 degrees or about 135 degrees. When there is no need to form an optical path through the reflection element, the processing unit 70 controls the reflection element by moving (e.g., rotating) the reflection element to the second angle. For example, the reflection element is parallel to the horizontal axis (X axis), and the reflection element further covers one corresponding lens to avoid the light beam (for example, ambient light) from entering to the multiple lens system 100 to interfere with imaging quality.

Figure 8:
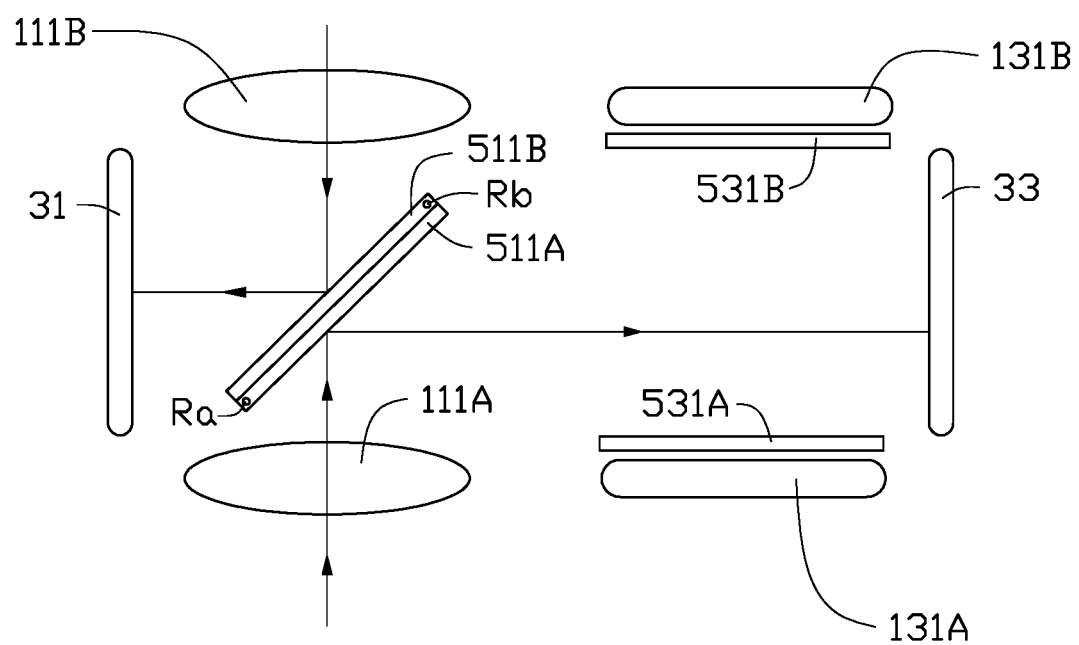
FIG. 8 is a diagram showing an optical path of the multiple lens system of FIG. 4 and a first reflecting unit and a second reflecting unit of the multiple lens system including two reflecting elements according to an exemplary embodiment of the present disclosure.

In detail, as illustrated in FIG. 8, when the multiple lens system 100 is in the first capturing mode, the first reflection element 511A of the first reflection unit 51 is overlapped with the first reflection element 511B. The first reflection elements 511A, 511B both move to the first angle. For example, an angle between the first reflection elements 511A, 511B and the horizontal axis (X axis) is about 45 degrees. As illustrated in FIG. 8, a positioning point $R_a$ of the first reflection element 511A is at an end of a left side of the first reflection element 511A. A positioning point $R_b$ of the first reflection element 511B is at an end of a right side of the first reflection element 511B. Then, a first image beam obtained by the first lens 111A of the first lens unit 11 can be reflected or projected onto a reflection surface of the first reflection element 511A, opposite to the first reflection element 511B, to the second image sensing element 33. A second image beam obtained by the first lens 111B of the first lens unit 11 can be reflected or projected onto a reflection surface, opposite of the first reflection element 511A, to the first image sensing element 31. The second reflection elements 531A, 531B of the second reflection unit 53 are both move to the second angle. For example, the second reflection elements 531A, 531B are both positioned parallel to the horizontal axis (X axis). The second reflection element 531A covers the second lens 131A and the second reflection element 531B covers the second lens 131B, thereby covering the light beam without imaging (for example, ambient light) to avoid affecting image quality.

Figure 9:
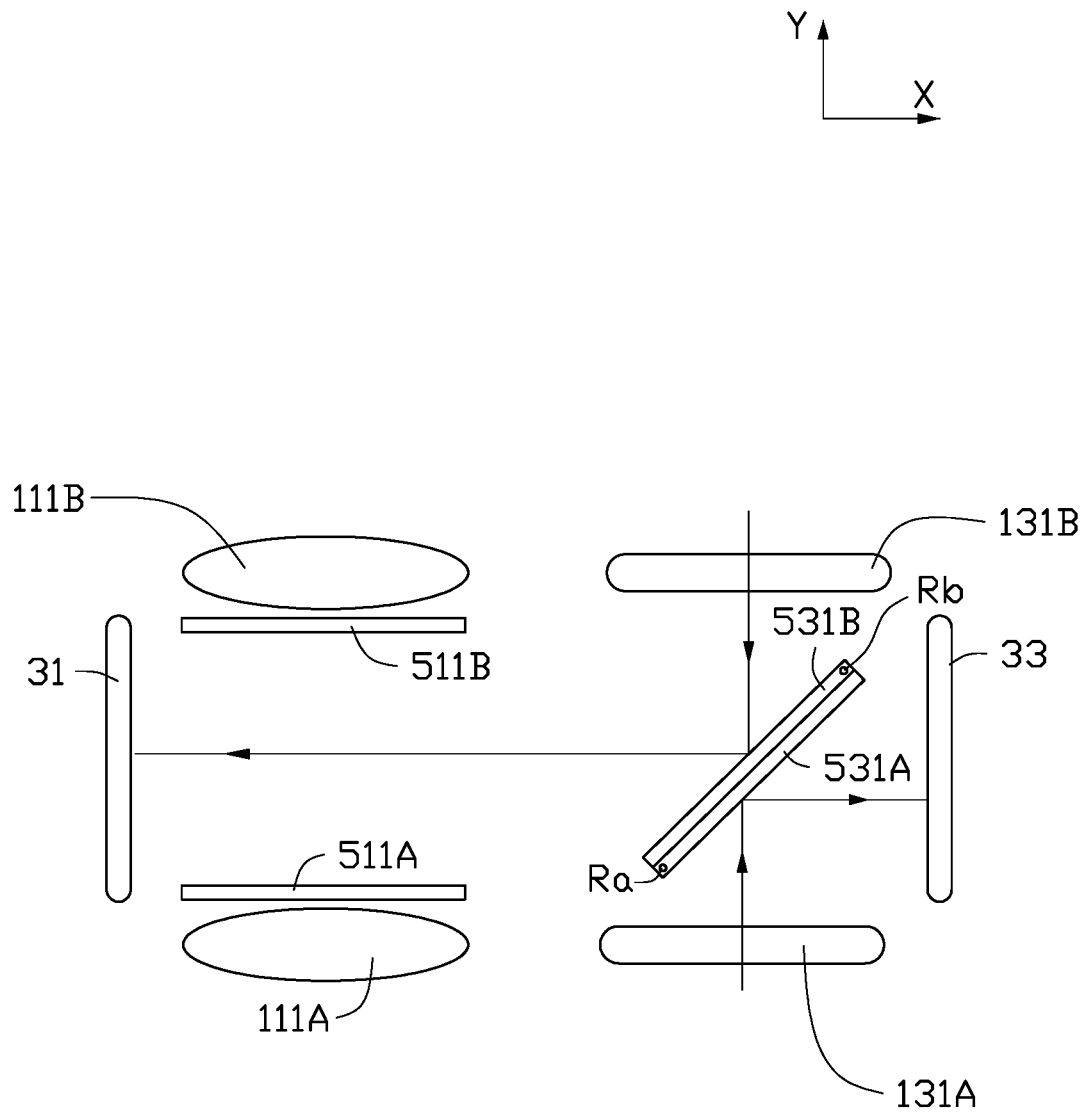
FIG. 9 is a diagram showing an optical path of the multiple lens system of FIG. 5 and a first reflecting unit and a second reflecting unit of the multiple lens system including two reflecting elements according to an exemplary embodiment of the present disclosure.

As illustrated in FIG. 9, when the multiple lens system 100 is in the second capturing mode, the second reflection element 531A of the first reflection unit 53 is overlapped with the second reflection element 531B. The second reflection elements 531A, 531B both move to the first angle. For example, an angle between the second reflection elements 531A, 531B and the horizontal axis (X axis) is about 45 degrees. As illustrated in FIG. 9, a positioning point $R_a$ of the second reflection element 531A is at an end of a left side of the second reflection element 531A. A positioning point $R_b$ of the second reflection element 531B is at an end of a right side of the second reflection element 531B. Then, a first image beam obtained by the second lens 131A of the second lens unit 13 can be reflected or projected onto a reflection surface of the second reflection element 531A, opposite to the second reflection element 531B, to the second image sensing element 33. A second image beam obtained by the second lens 131B of the second lens unit 13 can be reflected or projected onto a reflection surface, opposite of the second reflection element 531A, to the first image sensing element 31. The first reflection elements 511A, 511B of the first reflection unit 51 are both move to the second angle. For example, the first reflection elements 511A, 511B are both positioned parallel to the horizontal axis (X axis). The first reflection element 511A covers the first lens 111A and the first reflection element 511B covers the first lens 111B, thereby covering the light beam without imaging (for example, ambient light) to avoid affecting image quality.

In this exemplary embodiment, the positioning point is a rotating axis of the first reflection elements 511A, 511B and the second reflection elements 531A, 531B. Then, the positioning point can act as a rotating point. The first reflection elements 511A, 511B and the second reflection elements 531A, 531B can rotate around the positioning point to the first angle, the second angle, or the third angle.

Figure 10:
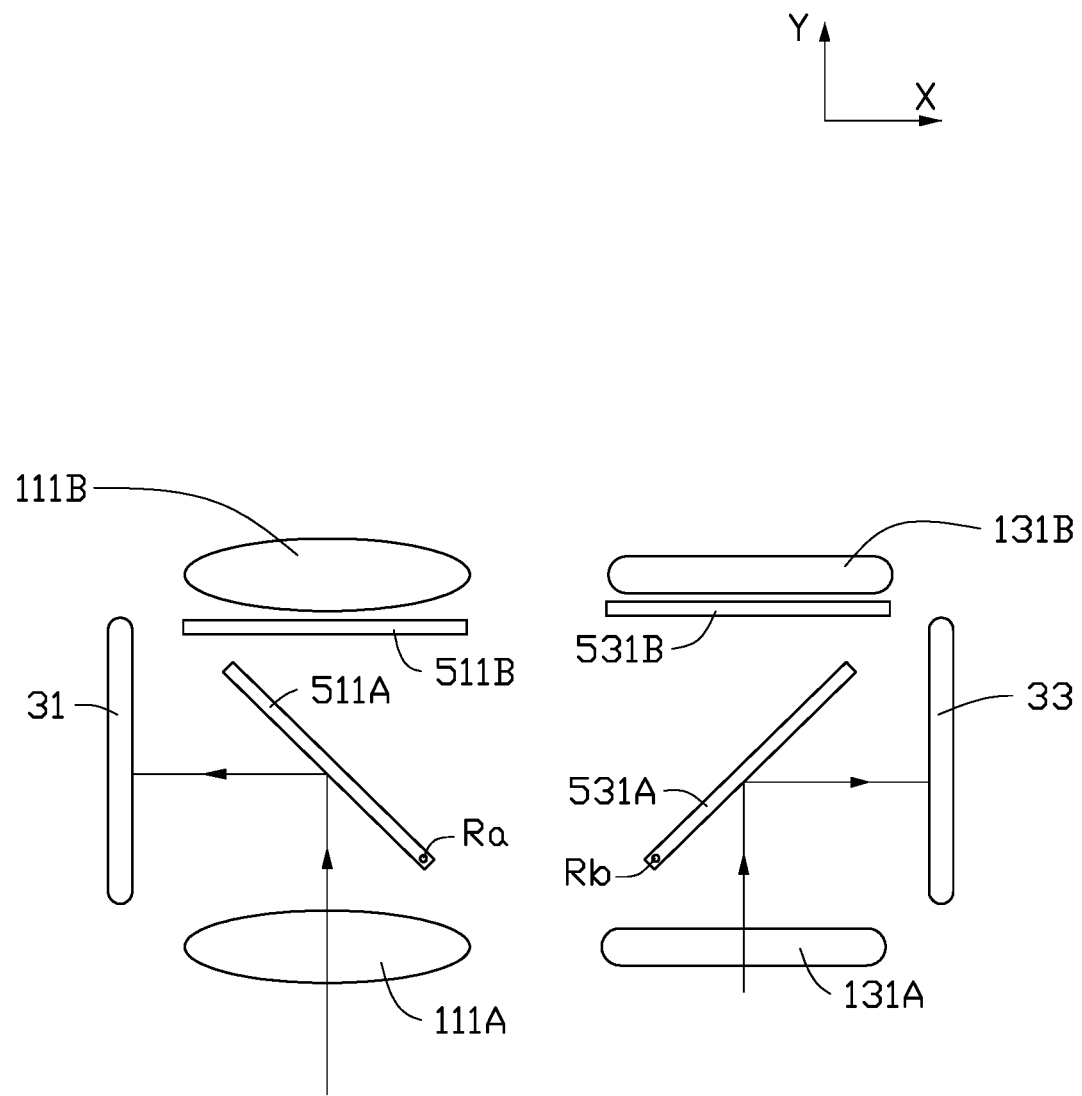
FIG. 10 is a diagram showing an optical path of the multiple lens system of FIG. 6 and a first reflecting unit and a second reflecting unit of the multiple lens system including two reflecting elements according to an exemplary embodiment of the present disclosure.

As illustrated in FIG. 10, when the multiple lens system 100 is in the third capturing mode, the first reflection element 511A of the first reflection unit 51 moves to the third angle. For example, an angle between the first reflection element 511A and the horizontal axis (X axis) is about 135 degrees. A positioning point $R_a$ of the first reflection element 511A is at an end of a right side of the first reflection element 511A. The first reflection element 511B of the first reflection unit 51 moves to the second angle and covers the first lens 111B positioned on the second surface 213. The second reflection element 531A of the second reflection unit 53 moves to the first angle. For example, an angle between the second reflection element 531A and the horizontal axis (X axis) is about 45 degrees. As illustrated in FIG. 10, a positioning point $R_b$ of the second reflection element 531A is at an end of a left side of the second reflection element 531A. The second reflection element 531B of the second reflection unit 53 moves to the second angle and covers the second lens 131B positioned on the second surface 213.

Figure 11:
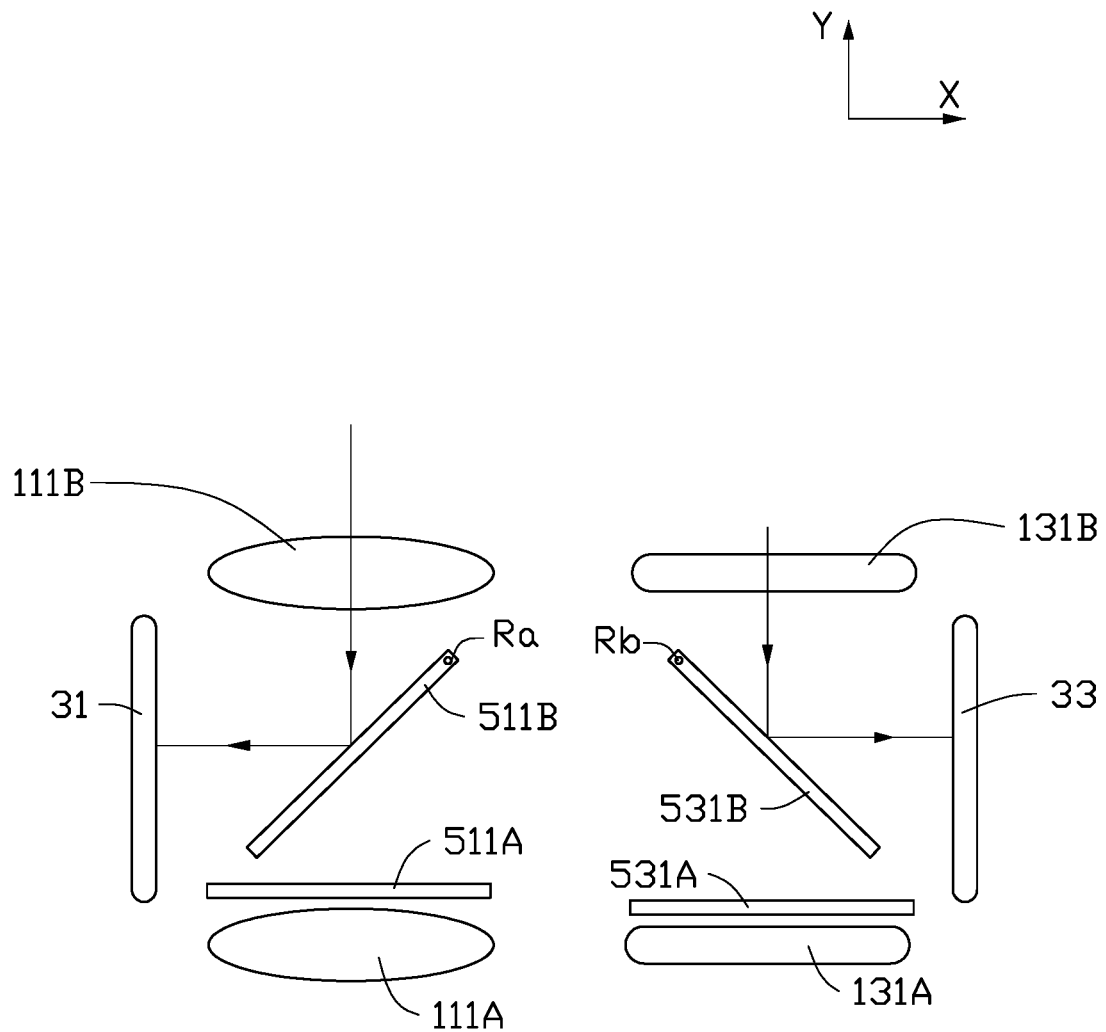
FIG. 11 is a diagram showing an optical path of the multiple lens system of FIG. 7 and a first reflecting unit and a second reflecting unit of the multiple lens system including two reflecting elements according to an exemplary embodiment of the present disclosure.

As illustrated in FIG. 11, when the multiple lens system 100 is in the fourth capturing mode, the first reflection element 511B of the first reflection unit 51 moves to the first angle. For example, an angle between the first reflection element 511B and the horizontal axis (X axis) is about 45 degrees. A positioning point $R_a$ of the first reflection element 511B is at an end of a right side of the first reflection element 511B (illustrated in FIG. 11). The first reflection element 511A of the first reflection unit 51 moves to the second angle and covers the first lens 111A positioned on the first surface 211. The second reflection element 531B of the second reflection unit 53 moves to the third angle. For example, an angle between the second reflection element 531B and the horizontal axis (X axis) is about 135 degrees. A positioning point $R_b$ of the second reflection element 531B is at an end of a left side of the second reflection element 531A (illustrated in FIG. 11). The second reflection element 531A of the second reflection unit 53 moves to the second angle and covers the second lens 131A positioned on the first surface 213.

Figure 12:
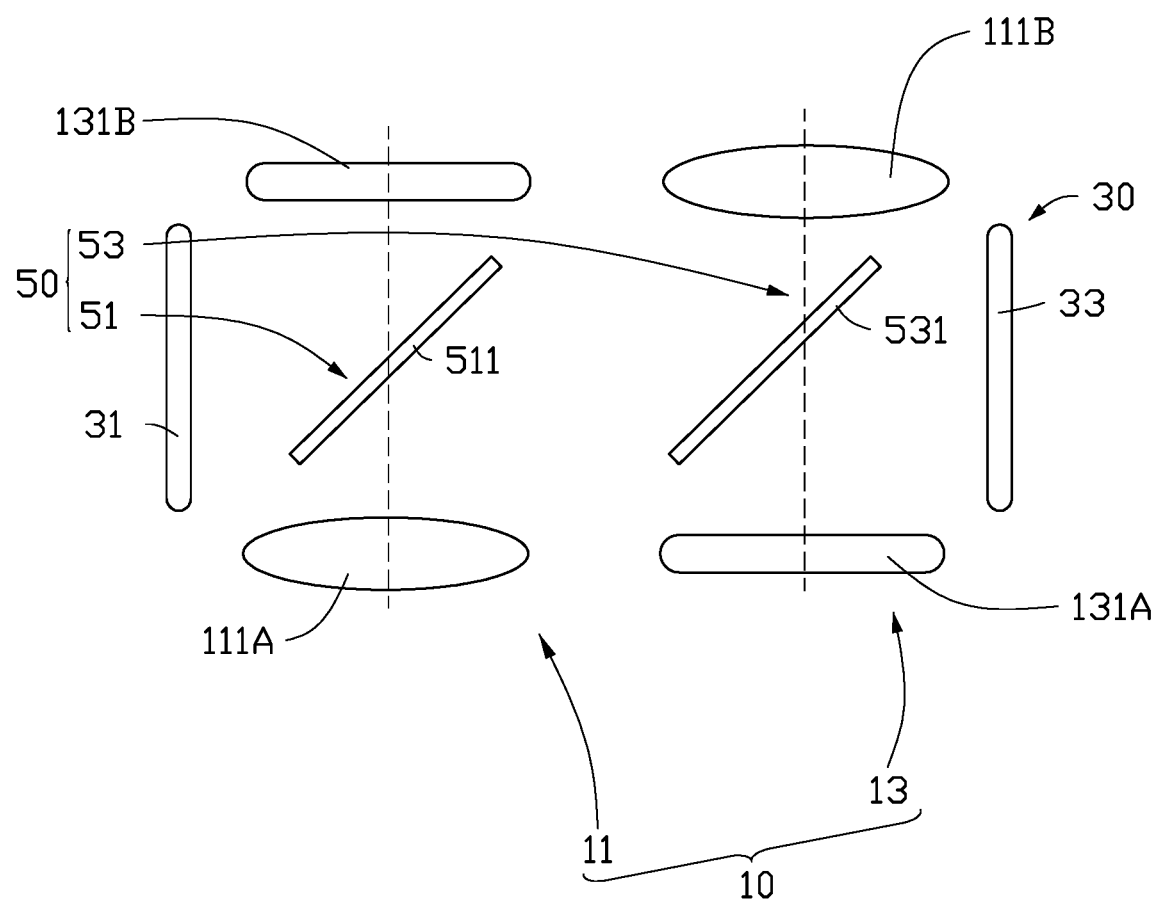
FIG. 12 is a schematic diagram of a portion of the multiple lens system of FIG. 1 according to another exemplary embodiment of the present disclosure.

In other exemplary embodiments, the lens module 10 is not limited to the above symmetric configuration and can be an asymmetrical configuration. For example, as illustrated in FIG. 12, the positions of the first lenses 111A, 111B and the second lenses 131A, 131B of the lens module 10 are switched at the first surface 211 and the second surface 213 of the portable electronic device 200. That is, the first lenses 111A, 111B are respectively positioned at the first surface 211 and the second surface 213 of the portable electronic device 200 and the optical axis of the first lens 111A does not overlap with the optical axis of the first lens 111B. The second lenses 131A, 131B are respectively positioned at the first surface 211 and the second surface 213 of the portable electronic device 200 and the optical axis of the second lens 131A, 131B does not overlap with the optical axis of the second lens 131B. The processing unit 70 controls an angle of the reflection units of the reflection module 50 to achieve different capturing modes.

Figure 13:
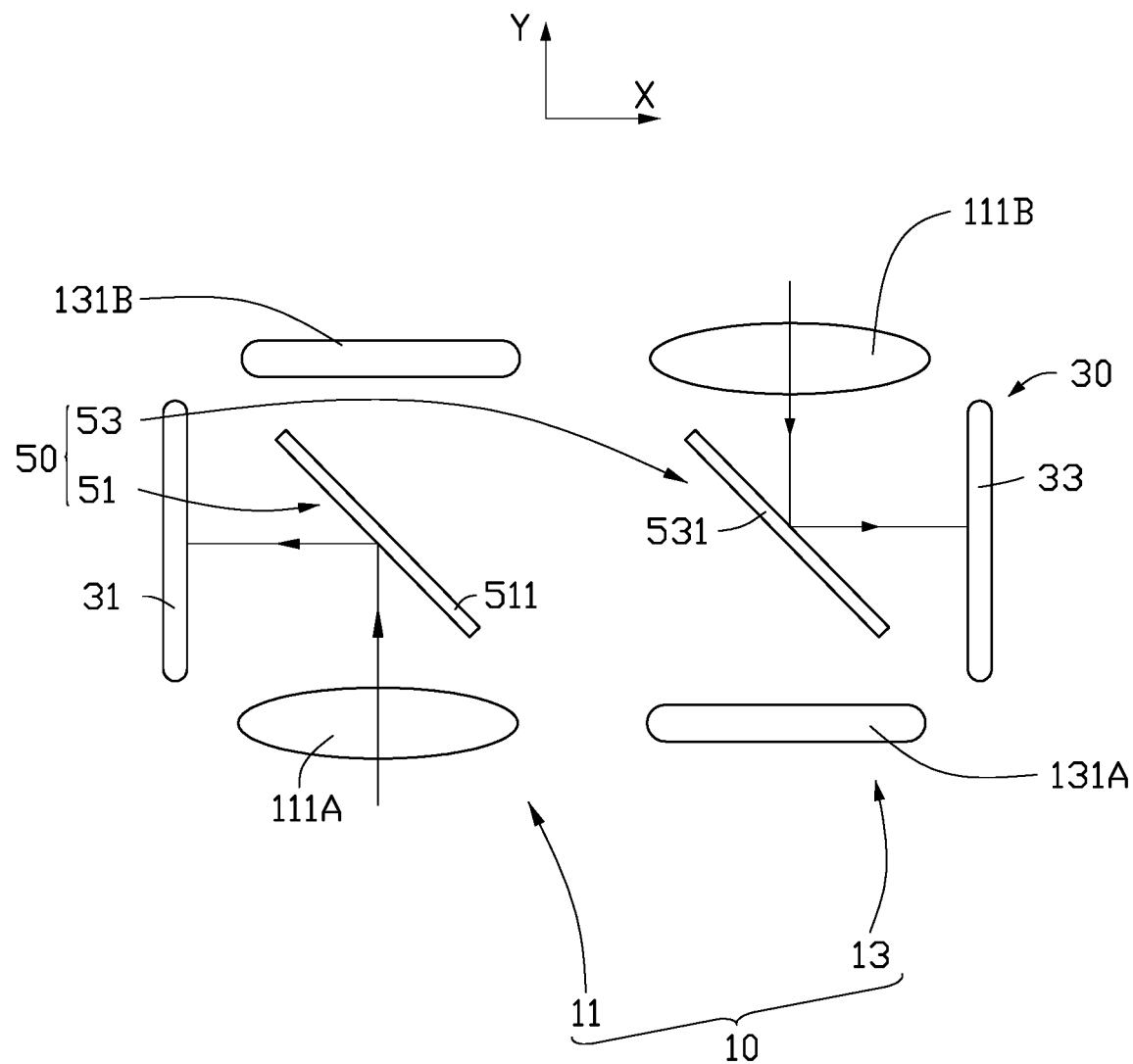
FIG. 13 is a diagram showing an optical path of the multiple lens system of FIG. 12 in the first capturing mode according to an exemplary embodiment of the present disclosure.

For example, as illustrated in FIG. 13, when the first capturing mode, that is, the panoramic capturing mode is selected, the processing unit 70 controls the first reflection element 511 and the second reflection element 531 by moving (e.g., rotating) the first reflection element 511 and the second reflection element 531 to the third angle. For example, an angle between the first reflection element 511 and the horizontal axis (X axis) and an angle between the second reflection element 531 and the horizontal axis (X axis) are both about 135 degrees. Then, a first image beam obtained by the first lens 111A of the first lens unit 11 can be reflected or projected onto the first reflection element 511 to the first image sensing element 31. A second image beam obtained by the first lens 111B of the first lens unit 11 can be reflected or projected onto the second reflection element 531 to the second image sensing element 31. Since the image beams obtained by the second lenses 131A, 131B of the second lens unit 13 do not have an optical path, the image beams obtained by the second lenses 131A, 131B of the second lens unit 13 are not reflected or projected to the first image sensing element 31 or the second image sensing element 33.

Figure 14:
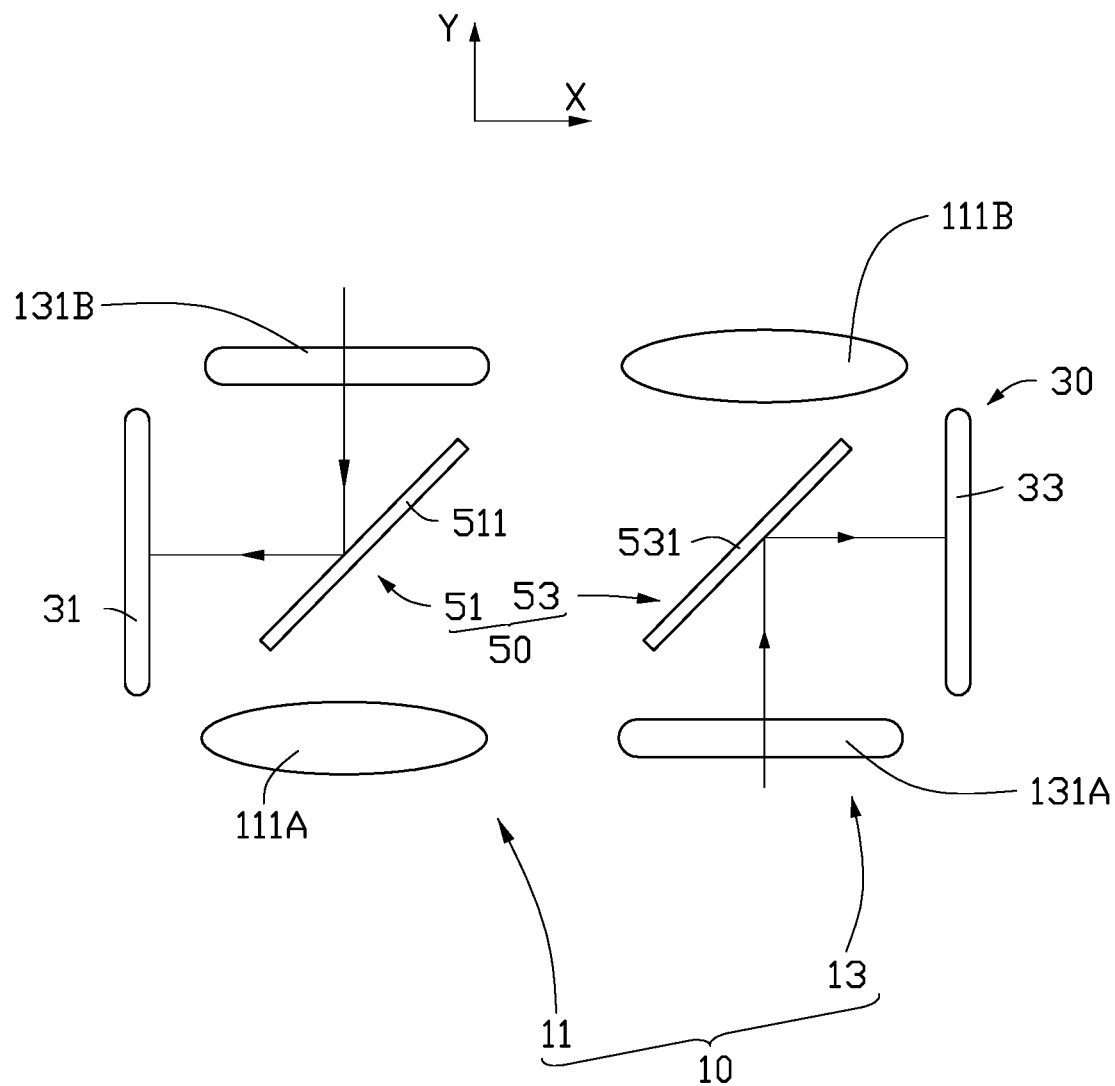
FIG. 14 is a diagram showing an optical path of the multiple lens system of FIG. 12 in the second capturing mode according to an exemplary embodiment of the present disclosure.

As illustrated in FIG. 14, when the second capturing mode is selected, the processing unit 70 controls the first reflection element 511 and the second reflection element 531 by moving (e.g., rotating) the first reflection element 511 and the second reflection element 531 to the first angle. For example, an angle between the first reflection element 511 and the horizontal axis (X axis) and an angle between the second reflection element 531 and the horizontal axis (X axis) are both about 45 degrees. Then, a first image beam obtained by the second lens 131B of the second lens unit 13 can be reflected or projected onto the first reflection element 511 to the first image sensing element 31. A second image beam obtained by the second lens 131A of the second lens unit 13 can be reflected or projected onto the second reflection element 531 to the second image sensing element 33. Since the image beams obtained by the first lenses 111A, 111B of the first lens unit 11 do not have an optical path, the image beams obtained by the first lenses 111A, 111B of the first lens unit 11 are not reflected or projected to the first image sensing element 31 or the second image sensing element 33.

Due to the lens module 10 uses the asymmetrical configuration, the lens module 10 can obtain a shortest optical path and a preferred image quality without any shielding.

In other exemplary embodiments, the lens module 10 can include three or more than three lens units. Then, a number of the reflection units of the reflection module 50 can be adjusted according to a number of the lens units. For example, a number of the reflection units of the reflection module 50 is equal to a number of the lens units of the lens module 10 and the number of the image sensing elements of the image sensing module 30 is still two. That is, even the lens module 10 includes multiple lens units, the image sensing module 30 still include two image sensing elements.

In other exemplary embodiments, the user interface of the display unit 23 can be operated to select one capturing mode, thereby triggering the processing unit 70 to control an angle of the reflection units and switching to different optical paths for selecting different lens or lenses.

In other exemplary embodiments, the portable electronic device 200 can trigger the processing unit 70 to select the capturing mode through other methods. For example, as illustrated in FIG. 3, the portable electronic device 200 includes a sensing module 25. The sensing module 25 can include different sensors, for example, an accelerometer, a position sensor, an approximate sensor. Then, the sensing module 25 can be triggered by a specific condition to detect a capturing mode and send the detected result to the processing unit 70. The processing unit 70 determines and selects one corresponding capturing mode according to the detected result. The processing unit 70 further controls an angle of the reflection units to switch to different optical paths for selecting different lens or lenses.

In other exemplary embodiments, the portable electronic device 200 can also include radio frequency module, acoustic module, storage module, power module, and other commonly function module to achieve corresponding functions.

Figure 15:
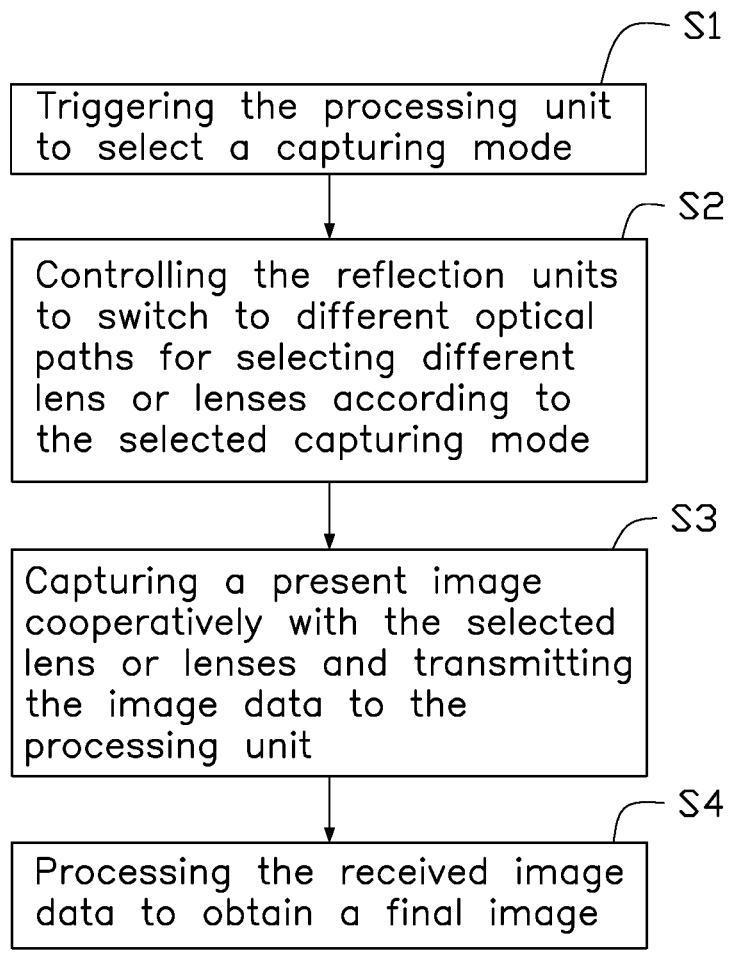
FIG. 15 is a flow chart of an exemplary operation method of the multiple lens system of FIG. 1 according to an exemplary embodiment of the present disclosure.

FIG. 15 illustrates an operation method of the multiple lens system 100. The portable electronic device 200 first triggers the processing unit 70 through the display unit 23 or other method to select a capturing mode. For example, one of the first capturing mode, the second capturing mode, the third capturing mode, and the fourth capturing mode can be selected as a present capturing mode (block S1). The processing unit 70 controls an angle of the reflection units according to the selected capturing mode, thereby switching to different optical paths for selecting different lens or lenses (block S2). For example, when the first capturing mode is selected, the processing unit 70 controls the first reflection element 511 by moving the first reflection element 511 to a first angle. For example, an angle between the first reflection element 511 and a horizontal axis (X axis) is about 45 degrees. The processing unit 70 also controls the second reflection element 531 by moving the second reflection element 531 to move to the second angle. For example, the second reflection element 531 is positioned parallel to the horizontal axis (X axis). A first image beam obtained by the first lens 111A of the first lens unit 11 can be reflected or projected onto a first reflection surface of the first reflection element 511 to the second image sensing element 33. A second image beam obtained by the first lens 111B of the first lens unit 11 can be reflected or projected onto a second reflection surface, opposite of the first reflection surface, of the first reflection element 511 to the first image sensing element 31. Since the image beams obtained by the second lenses 131A, 131B of the second lens unit 13 do not have an optical path, the image beams obtained by the second lenses 131A, 131B are not reflected or projected to the first image sensing element 31 or the second image sensing element 33. The first image sensing element 31 and the second image sensing element 33 captures the present image cooperatively with the selected lens or lenses, for example, the first lens 111A and the first lens 111B, and transmits the image data to the processing unit 70 (block S3). The processing unit 70 processes the received image data based on image processing technologies, such as image combining, image fusion, etc., then obtains a final image to satisfy use's need, for example, obtains a panoramic image (block S4).

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A multiple lens system comprising:
   a lens module comprising at least two lenses, the at least two lenses forming a plurality of lens groups, each of the plurality of lens groups comprising at least one lens of the at least two lenses;
   at least one reflecting unit;
   a first image sensing element;
   a second image sensing element; and
   a processing unit, the processing unit electrically connected to the first image sensing element and the second image sensing element;
   wherein the processing unit controls at least one angle of the at least one reflection unit according to a capturing mode to change at least one optical path of the at least one reflection unit in order to pick up image beam of one lens group while giving up image beams of other lens group or groups to carry out the capturing mode;
   wherein the picked image beam is reflected or projected to at least one of the first image sensing element and the second image sensing element through the at least one optical path;
   wherein the first image sensing element and the second image sensing element are positioned on two sides of the lens module;
   wherein the multiple lens system is in a portable electronic device, the portable electronic device comprises a first surface and a second surface facing away from each other, the lens module comprises a first lens unit and a second lens unit, the first lens unit comprises two first lenses, the second lens unit comprises two second lenses, the two first lenses are respectively symmetrically positioned at the first surface and the second surface, the two second lenses are respectively symmetrically positioned at the first surface and the second surface;
   wherein the at least one reflection unit comprises a first reflection unit and a second reflection unit, the first reflection unit comprises two first reflection elements and the second reflection unit comprises two second reflection elements, the two first reflection elements are positioned between the two first lenses and the two second reflection elements are positioned between the two second lenses;
   wherein the processing unit controls an angle of each of the first reflection elements and the second reflection elements according to the capturing mode so that image beams obtained by the two first lenses are respectively reflected or projected by the two first reflection elements to the first image sensing element and the second image sensing element, and the two second reflection elements respectively cover the two second lens.

2. The multiple lens system of claim 1, wherein the processing unit is further configured to combine or fuse image data from the first image sensing element and the second image sensing element to obtain a final image.

3. The multiple lens system of claim 1, wherein the second surface and optical axes of the two first lenses are overlapped with each other; the second surface and optical axes of the two second lenses are overlapped with each other.

4. The multiple lens system of claim 3, wherein an angle of coverage of the first lenses is different from an angle of coverage of the second lenses.

5. The multiple lens system of claim 1, wherein optical axis of the two first lenses are not overlapped with each other; optical axes of the two second lenses are not overlapped with each other.

6. A multiple lens system comprising:
a lens module comprising at least two lenses, the at least two lenses forming a plurality of lens groups, each of the plurality of lens groups comprising at least one lens of the at least two lenses;
at least one reflecting unit;
a first image sensing element;
a second image sensing element; and
a processing unit, the processing unit electrically connected to the first image sensing element and the second image sensing element;
wherein the processing unit controls at least one angle of the at least one reflection unit according to a capturing mode to change at least one optical path of the at least one reflection unit in order to pick up image beam of one lens group while giving up image beams of other lens group or groups to carry out the capturing mode;
wherein the picked image beam is reflected or projected to at least one of the first image sensing element and the second image sensing element through the at least one optical path;
wherein the first image sensing element and the second sensing image element are positioned on two sides of the lens module;
wherein the multiple lens system is in a portable electronic device, the portable electronic device comprises a first surface and a second surface facing away from each other, the lens module comprises a first lens unit and a second lens unit, the first lens unit comprises two first lenses, the second lens unit comprises two second lenses, the two first lenses are respectively symmetrically positioned at the first surface and the second surface and optical axes of the two first lenses are overlapped with each other; the two second lenses are respectively symmetrically positioned at the first surface and the second surface and optical axes of the two second lenses are overlapped with each other;
wherein the at least one reflection unit comprises a first reflection unit and a second reflection unit, the first reflection unit comprises two first reflection elements and the second reflection unit comprises two second reflection elements, the two first reflection elements are positioned between the two first lenses and the two second reflection elements are positioned between the two second lenses;
wherein the processing unit controls an angle of each of the first reflection elements and the second reflection elements according to the capturing mode so that image beams obtained by the two second lenses are respectively reflected or projected by the two second reflection elements to the first image sensing element and the second image sensing element, and the two first reflection elements respectively cover the two first lens.

7. A multiple lens system comprising:
a lens module comprising at least two lenses, the at least two lenses forming a plurality of lens groups, each of the plurality of lens groups comprising at least one lens of the at least two lenses;
at least one reflecting unit;
a first image sensing element;
a second image sensing element; and
a processing unit, the processing unit electrically connected to the first image sensing element and the second image sensing element;
wherein the processing unit controls at least one angle of the at least one reflection unit according to a capturing mode to change at least one optical path of the at least one reflection unit in order to pick up image beam of one lens group while giving up image beams of other lens group or groups to carry out the capturing mode;
wherein the picked image beam is reflected or projected to at least one of the first image sensing element and the second image sensing element through the at least one optical path;
wherein the first image sensing element and the second sensing image element are positioned on two sides of the lens module;
wherein the multiple lens system is in a portable electronic device, the portable electronic device comprises a first surface and a second surface facing away from each other, the lens module comprises a first lens unit and a second lens unit, the first lens unit comprises two first lenses, the second lens unit comprises two second lenses, the two first lenses are respectively symmetrically positioned at the first surface and the second surface and optical axes of the two first lenses are overlapped with each other; the two second lenses are respectively symmetrically positioned at the first surface and the second surface and optical axes of the two second lenses are overlapped with each other;
wherein the at least one reflection unit comprises a first reflection unit and a second reflection unit, the first reflection unit comprises two first reflection elements and the second reflection unit comprises two second reflection elements, the two first reflection elements are positioned between the two first lenses and the two second reflection elements are positioned between the two second lenses;
wherein the processing unit controls an angle of each of the first reflection elements and the second reflection elements according to the capturing mode so that image beams obtained by the first lens positioned on the first surface and the second lens positioned on the first surface are respectively reflected or projected by one of the first reflection elements and one of the second reflection elements to the first image sensing element and the second image sensing element, the first lens positioned on the second surface and the second lens positioned on the second surface are respectively covered by the other first reflection element and the other second reflection element.

8. A multiple lens system comprising:
a lens module comprising at least two lenses, the at least two lenses forming a plurality of lens groups, each of the plurality of lens groups comprising at least one lens of the at least two lenses;
at least one reflecting unit;
a first image sensing element;
a second image sensing element; and
a processing unit, the processing unit electrically connected to the first image sensing element and the second image sensing element;
wherein the processing unit controls at least one angle of the at least one reflection unit according to a capturing mode to change at least one optical path of the at least one reflection unit in order to pick up image beam of one lens group while giving up image beams of other lens group or groups to carry out the capturing mode;
wherein the picked image beam is reflected or projected to at least one of the first image sensing element and the second image sensing element through the at least one optical path;
wherein the first image sensing element and the second sensing image element are positioned on two sides of the lens module;
wherein the multiple lens system is in a portable electronic device, the portable electronic device comprises a first surface and a second surface facing away from each other, the lens module comprises a first lens unit and a second lens unit, the first lens unit comprises two first lenses, the second lens unit comprises two second lenses, the two first lenses are respectively symmetrically positioned at the first surface and the second surface and optical axes of the two first lenses are overlapped with each other; the two second lenses are respectively symmetrically positioned at the first surface and the second surface and optical axes of the two second lenses are overlapped with each other;
wherein the at least one reflection unit comprises a first reflection unit and a second reflection unit, the first reflection unit comprises two first reflection elements and the second reflection unit comprises two second reflection elements, the two first reflection elements are positioned between the two first lenses and the two second reflection elements are positioned between the two second lenses;
wherein the processing unit controls an angle of each of the first reflection elements and the second reflection elements according to the capturing mode so that image beams obtained by the first lens positioned on the second surface and the second lens positioned on the second surface are respectively reflected or projected by one of the first reflection elements and one of the second reflection elements to the first image sensing element and the second image sensing element, the first lens positioned on the first surface and the second lens positioned on the first surface are respectively covered by the other first reflection element and the other second reflection element.

9. A portable electronic device comprising:
a multiple lens system, the multiple lens system comprising:
a lens module comprising at least two lenses, the at least two lenses forming a plurality of lens groups, each of the plurality of lens groups comprising at least one lens of the at least two lenses;
at least one reflecting unit;
a first image sensing element;
a second image sensing element; and
a processing unit, the processing unit electrically connected to the first image sensing element and the second image sensing element; and
a display unit configured to set a capturing mode;
wherein the processing unit controls at least one angle of the at least one reflection unit according to the capturing mode to change at least one optical path of the at least one reflection unit in order to pick up image beam of one lens group while giving up image beams of other lens group or groups to carry out the capturing mode; and wherein the picked image beam is reflected or projected to at least one of the first image sensing element and the second image sensing element through the at least one optical path;
wherein the first image sensing element and the second image sensing element are positioned on two sides of the lens module;
wherein the multiple lens system is in a portable electronic device, the portable electronic device comprises a first surface and a second surface facing away from each other, the lens module comprises a first lens unit and a second lens unit, the first lens unit comprises two first lenses, the second lens unit comprises two second lenses, the two first lenses are respectively symmetrically positioned at the first surface; the two second lenses are respectively symmetrically positioned at the first surface and the second surface;
wherein the at least one reflection unit comprises a first reflection unit and a second reflection unit, the first reflection unit comprises two first reflection elements and the second reflection unit comprises two second reflection elements, the two first reflection elements are positioned between the two first lenses and the two second reflection elements are positioned between the two second lenses;
wherein the processing unit controls an angle of each of the first reflection elements and the second reflection elements according to the capturing mode so that image beams obtained by the two first lenses are respectively reflected or projected by the two first reflection elements to the first image sensing element and the second image sensing element, and the two second reflection elements respectively cover the two second lens.

10. The portable electronic device of claim 9, further comprising a sensing module, wherein the sensing module is electrically connected to the processing unit, the sensing module is configured to be triggered by a specific condition to detect the capturing mode and send a detected result to the processing unit, the processing unit determines and selects the capturing mode according to the detected result.

* * * * *